United States Patent [19]

Smith

[11] Patent Number: 4,933,555

[45] Date of Patent: Jun. 12, 1990

[54] THERMAL IMAGER

[75] Inventor: Brian F. Smith, Essex, England

[73] Assignee: GEC-Marconi Limited, Stanmore, United Kingdom

[21] Appl. No.: 153,574

[22] Filed: Feb. 3, 1988

[30] Foreign Application Priority Data

Feb. 3, 1987 [GB] United Kingdom ............... 8702383

[51] Int. Cl.$^5$ .............................................. G01J 5/48
[52] U.S. Cl. ................... 250/330; 250/252.1; 250/334; 250/493.1
[58] Field of Search ........ 250/330, 332, 334, 252.1 R, 250/493.1, 495.1, 504 R; 374/1, 2, 124, 126

[56] References Cited

U.S. PATENT DOCUMENTS

| | | | |
|---|---|---|---|
| 3,478,211 | 11/1969 | Moser | 250/493.1 |
| 3,617,745 | 11/1971 | Reed | 250/352 |
| 4,163,602 | 8/1979 | Schütz et al. | 250/334 |
| 4,280,050 | 7/1981 | Callender et al. | 250/330 |
| 4,419,692 | 12/1983 | Modisette et al. | 250/334 |
| 4,421,985 | 12/1983 | Billingsley et al. | 250/353 |
| 4,450,479 | 5/1984 | Horne | 250/334 |
| 4,524,385 | 6/1985 | Billingsley et al. | 250/330 |
| 4,705,945 | 11/1987 | Worcester | 250/334 |

FOREIGN PATENT DOCUMENTS 0060827  5/1980  Japan ...................... 250/330

Primary Examiner—Constantine Hannaher
Attorney, Agent, or Firm—Lowe, Price, LeBlanc, Becker & Shur

[57] ABSTRACT

A thermal imager including a cryogenically cooled detector element array and a scanning element has an optical system with a field of view limited by a field stop (2). A retroreflective region (6) is provided on part of the field stop to act as a temperature reference by allowing the detector array to "look at" itself. A second, different temperature reference (5) is provided on another part of the field stop and the two references are used to equalize and adjust the output characteristics of the elements in the detector array.

14 Claims, 4 Drawing Sheets

THERMAL IMAGER

This invention relates to a thermal imager and in particular it relates to the provision of a thermal reference for improving the quality of the image produced.

In a typical scanned thermal imager, infra-red radiation is admitted by means of an optical system to a scanning element and from there to each element of a multi-element detecting array. The signals from the array are then used to generate images upon, for instance, a video screen, depending upon the temperature of each part of the viewed scene.

However, multi element detectors often suffer from differences in thermal sensitivity between the elements and these differences can alter with use due to thermal drift, etc. This can lead to inaccuracies in the image and make the image difficult to understand. These variations in output are usually corrected electronically. One method of achieving this is to use two reference targets, generally outside the imaging field of view of the scanner but within the overall field of view. The two targets are arranged to have different apparent temperatures which may be produced by active or passive methods, commonly by the use of Peltier cells. In use, the system "looks at" the two targets in turn and alters the gain of the amplifier for each element of the detector so that they produce the correct output at both reference temperatures. This method does however suffer from requiring accurate temperature control of the reference surfaces, and it can be electrically and mechanically complex. Furthermore, it is difficult to produce large surfaces of uniform temperature without employing large thermal masses and hence large heat inputs, leading to a large energy requirement.

According to the present invention there is provided a thermal imager including a thermal sensor and retro-reflective means for providing a retro-reflected image of the sensor for use as a first temperature reference.

Preferably the thermal imager is a scanning type imager adapted to scan the scene over a fixed field of view to obtain an image thereof and the retro-reflective means is situated outside the field of view of the scene but within the possible field of view which may be scanned by the imager.

Thermal imaging detectors are generally cryogenically cooled and hence, since an image of the detector is reflected back onto itself by the retro-reflectors, the detector in effect "sees" a reference area which has the same effective temperature as the detector itself. The invention therefore provides a reliable passive method of obtaining a temperature reference, requiring no further temperature controlling apparatus other than that which is already fitted to the detector to cool it.

A reflection of an imager back on to itself is known as a narcissus and has, up to now been seen as a nuisance and to have a degrading effect upon an image since an image of the detector, at a low temperature, is seen superimposed on the imager's field of view which is nominally at room temperature. This is due to reflection at lens surfaces, windows, etc. Embodiments of the present invention utilise the narcissus effect in a positive sense to improve the image. A narcissus is produced at a field angle just beyond the normal field of view.

Many telescopes include a nominally rectangular field stop, for the purpose of providing a reference or "clamp" surface which can be viewed by all detector elements but is outside the normal scanning field of view of the detector. This is shown in FIGS. 1 and 2 of the accompanying drawings. Those clamp regions which are seen by the detector may be at the temperature of the telescope or, by active means such as Peltier cells, be raised to any desired temperature. In a preferred embodiment of the present invention one of these clamp regions is treated so as to possess retro-reflective properties. This region therefore provides a reference surface at a different temperature from the clamp surface.

The retro-reflective region may be provided by a plurality of corner cube structures, a corner cube being a well known form having a structure with three orthogonal faces and thus having the property of returning radiation back along its original direction.

As is shown in FIG. 2, the clamp surfaces of the field stop may be symmetrical about the optical axis of the system and hence the stop may be rotated through 180° to facilitate scanning in both directions. The magnitude of the temperature difference between the first clamp region and the retro-reflective region may be modified by employing filtering means on the retro-reflective region to alter the characteristics of reflected radiation from the detector. This may be by the use of filters which could take the form of multi-layer coatings on the retro-reflective regions.

Embodiments of the invention will now be described by way of example only with reference to the accompanying drawings in which.

Figure 1:
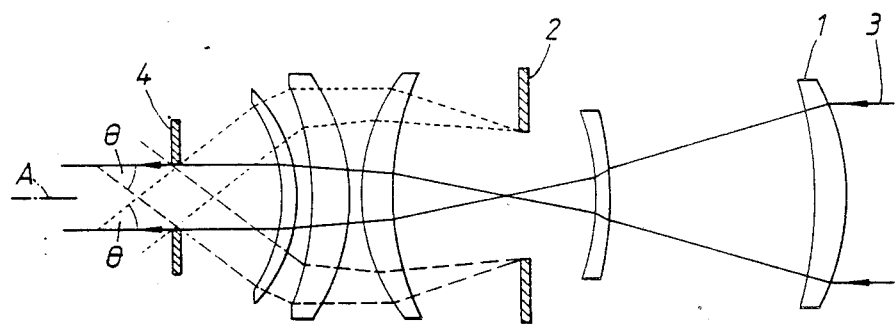
FIG. 1 shows a typical telescope system used to collect radiation for a thermal imager and also shows some schematic ray paths.

Referring to FIG. 1, there is shown a typical telescope system for use with a thermal imager. The system includes a plurality of lenses such as that shown as 1, and a nominally rectangular field stop 2. Image rays such as that shown at 3 are focussed and collimated by the optical system and passed through an entrance pupil 4 of the imager. They are passed to a six-sided polygonal scanning element and a scanning mirror (not shown) which direct radiation onto typically eight rows of detector elements while spinning rapidly and being gradually tilted. This results in a swathe-like pattern being formed of the type shown in FIG. 5 which will be further described below. This type of detection in swathes is well known.

It is seen that radiation entering the system at an angle greater than $\theta$ to the optical axis A, will be stopped by the field stop 2 and will not pass through to the detector elements. Hence the field stop 2 serves to limit the imaged field of view. Typically the field of view is limited to around 60°. However a six-sided polygon can scan a beam through 120° and hence the actual field of view of the thermal imager is greater than that field of view which is actually used. If the polygon is arranged to scan through an angle greater than 60° then the imager will in effect "look at" the aperture stop.

Figure 2:
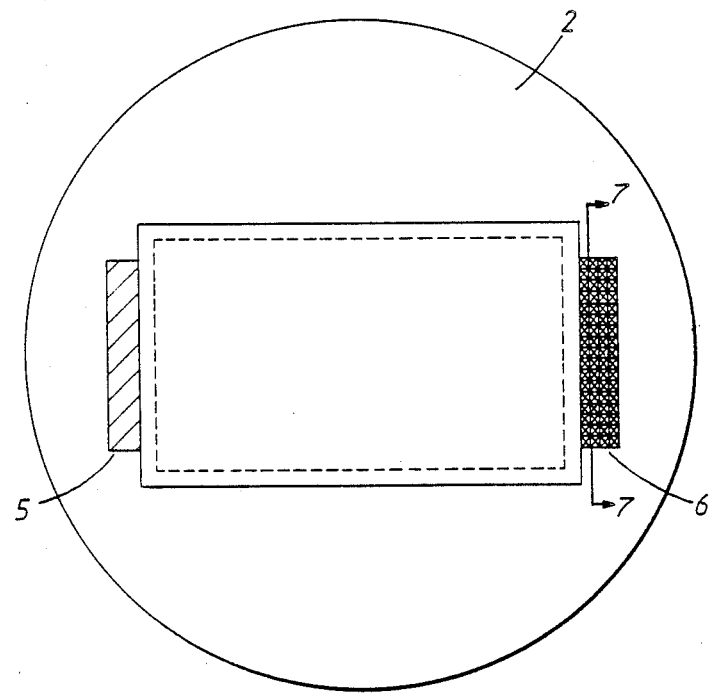
FIG. 2 shows the areas of a field stop aperture which may be used for "clamping"

This principle is used in embodiments of the present invention. Referring to FIG. 2, the field stop 2 is shown and the dotted line indicates the field of view of the system. Two clamp regions 5 and 6 are constructed within the field stop. Region 5 is untreated so as to be at the ambient temperature, or alternatively may be provided with Peltier cells which can be heated to any desired temperature. Region 6 is treated with a retro-reflective structure such as a micro-structure of corner cubes. Although shown in FIG. 2 as extending for most of the height of the field stop aperture, the clamp regions 5 and 6 may be of a size such as that shown in FIG. 5, whereby only one swathe in each field scan of the system is adapted to scan and image the clamp region.

Figure 3A:
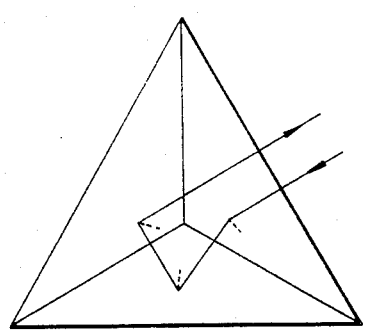
FIGS. 3a and 3b show the principle of a corner cube structure.
Figure 3B:
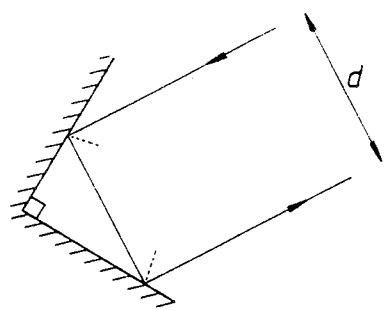
Figure 4:
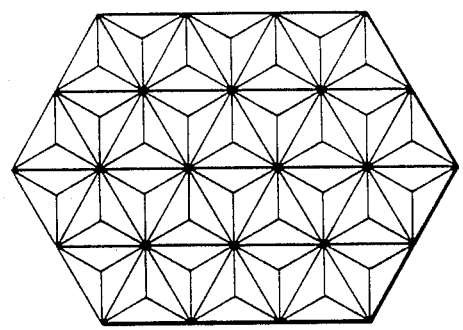
FIG. 4 shows a corner cube microstructure which may be applied to one of the clamp regions of FIG. 2.

The principle of retro-reflection by a corner cube is shown schematically in FIGS. 3a and 3b, of which FIG. 3(a) is a three dimensional representation showing the effects of reflection of an impinging beam at each surface. The effect is not easy to show in three dimensions however and FIG. 3(b) shows a simplified example in two dimensions, showing clearly that any beam impinging on the surfaces of a corner cube will eventually be reflected back in the same direction from whence it came. The clamp region 6 of FIG. 2 may be fitted with a microstructure of such corner cubes as is shown in FIG. 4. The micro-structure is metallised for good reflection characteristics in the infra-red band. The structure may be identical to that used in the type of reflectors currently used on the rear of bicycles and motor vehicles. It may have a structure of offset rows of cubes, similar to that seen in the geographical feature in Ireland known as the Giants Causeway.

Figure 5:
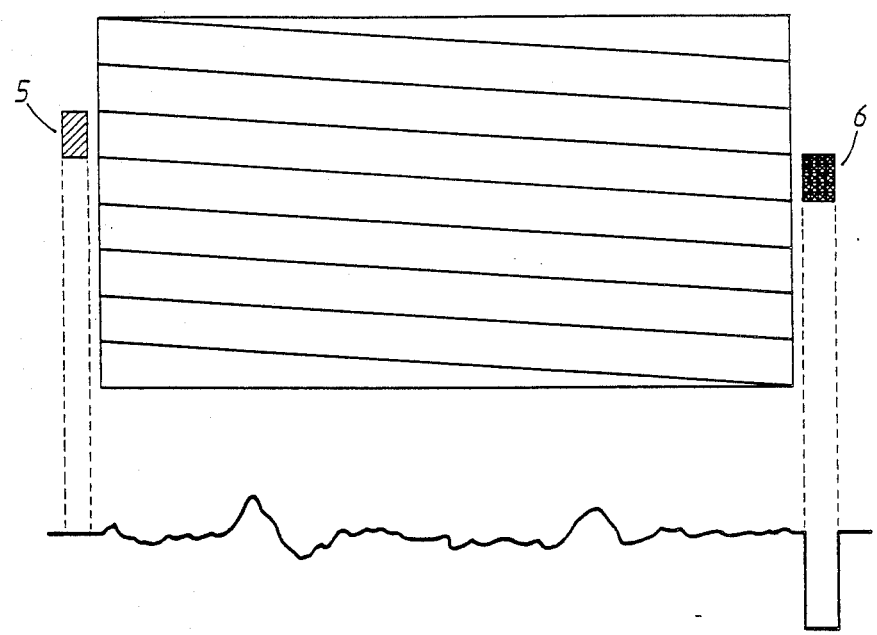
FIG. 5 shows an example of the relative positioning of clamping surfaces in one embodiment of the invention.

The regions 5 and 6, once treated can be used as reference or clamp regions to ensure that, after amplification, all the elements of the thermal detector give the same reading as each other for a constant temperature being viewed. In the embodiment illustrated in FIG. 5 on every third swathe of a field scan, the scanning element is arranged to scan through a greater angle than the angle allowed by the field stop. In the third swathe, therefore, the imager first views reference area 5 which will for simplicity be taken as being at the ambient temperature of the telescope. All the detector elements therefore look at a constant source of the same temperature and any differences between them may be noted. The rotating element then scans through the swathe and may produce a typical output as shown at the bottom of FIG. 5. After the object has been viewed, the element continues to scan and the detectors begin to "look at" region 6. Since this has been treated with a retro-reflective structure the detectors in effect look at themselves and the temperature at which they are operating. This temperature is carefully controlled by cryogenic means well known in the art and will typically be around 70° K., i.e., about −200° C. This can produce a dip in the output from each of the detectors as is shown in the Figure. This narcissus value is also noted for each detector element. The scanning element then proceeds to scan through its normal field of view for the remaining swathes of the scan. The noted values of the outputs for each detector element for the two reference regions 5 and 6 may be used after the completion of this swathe to calibrate the system and allow for variations in the outputs. The process may be repeated either once in every field scan or perhaps only occasionally, say once every ten scans to allow for gradual thermal drift.

Figure 6:
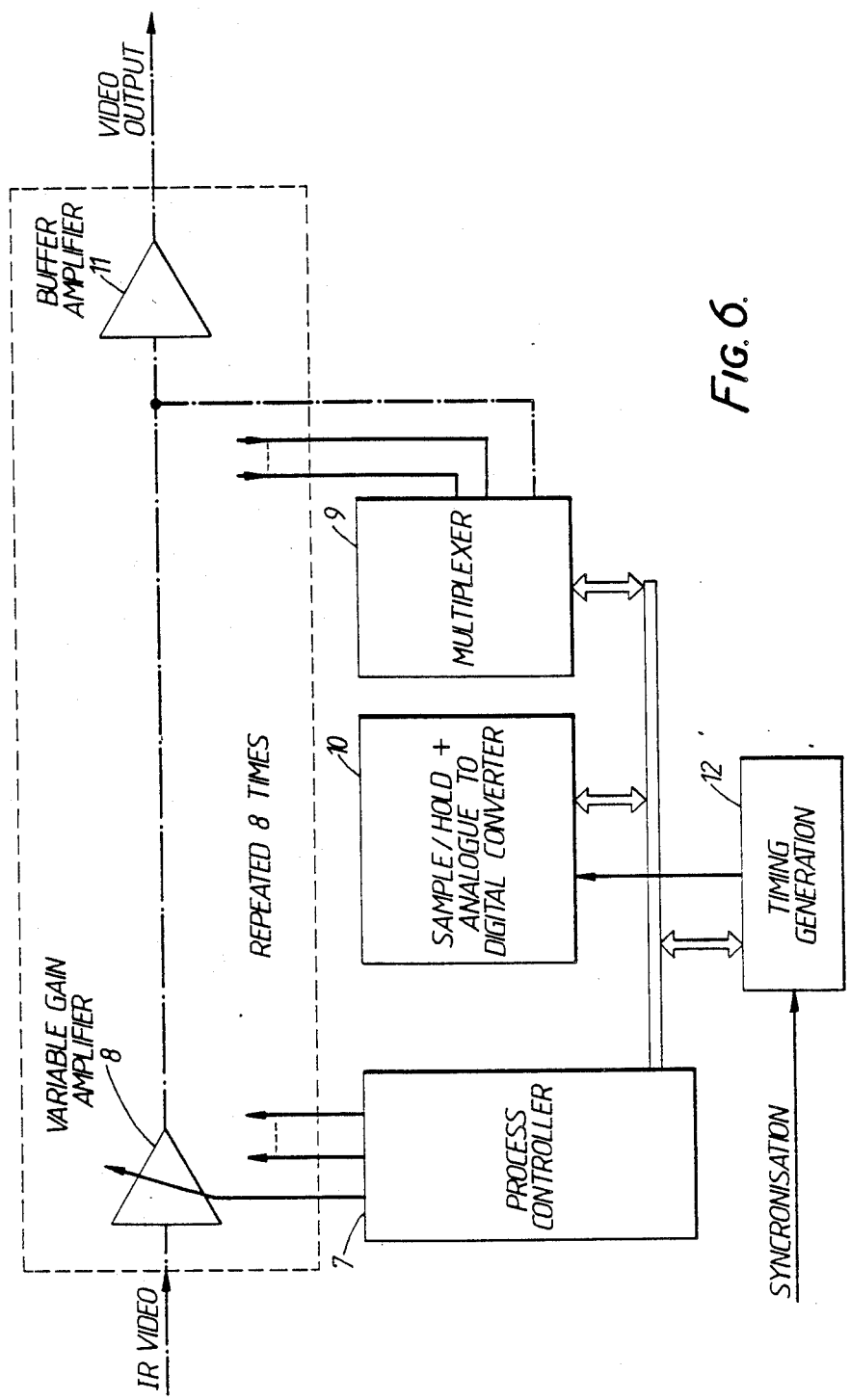
FIG. 6 shows schematically apparatus for equalising the outputs of the detector elements in a system.

FIG. 6 shows typical electronic apparatus which may be used to equalise the outputs of each channel, or row of detectors in the system. The two different temperature targets 5 and 6 are sampled as described above at different times on the IR video output. A process controller 7 then modifies the gain 8 of each channel in turn, through a multiplexer 9 and sample/hold and ADC circuit 10, to provide the required output from a buffer amplifier 11. A timing generator 12 is synchronised with the clock signals controlling the scanning process.

The circuit shown in FIG. 6 is only representative of one of several different types of control loop which may be used to equalise the outputs of the detectors and are well known in the art.

Figure 7:
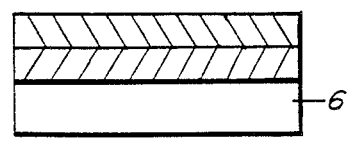
FIG. 7 shows a cross sectional view taken along line 7—7 of FIG. 2.

By employing multilayer filters or coatings on the retro-reflective region shown by 14, 16 in FIG. 7, the amount of narcissus can be varied. Hence the depth of the narcissus region in FIG. 5 may be varied by predetermined amounts, perhaps to obtain a temperature reference closer to the minimum temperature to be observed by the apparatus and hence to improve the linearity of the system.

Apparatus embodying the present invention noticeably improves upon the "swathing" effect often seen in such detectors where because of differences in the outputs of the eight detectors, thin lines are seen across the swathes and the swathe bands are visibly observed in the image, noticeably degrading it. Use of the present invention substantially reduces the swathing effect since each detector element may be individually controlled according to values derived from its looking at two reference regions and hence differences between them can be substantially reduced.

The clamp regions 5 and 6 need not necessarily be provided on the field stop and can be provided on any two surfaces, provided that one of the surfaces is located to provide an ambient temperature high emissity surface and the other surface is adapted to carry the microstructure of corner cubes of other retroflective structure.

The corner cubes should preferably be of dimensions as small as possible since, as is clear from FIG. 3(b) the smaller the corner cube the smaller is the distance between the inward and outward rays and hence the better the narcissus image. Since the clamp regions are usually situated on or near the field stop of the telescope the narcissus image focus at the detectors may be varied. This is an advantage since it means that a diffuse image may be obtained and any local "hot spots" on the detector will be overwhelmed by the overall effect and hence a region of constant temperature will be perceived.

I claim:

1. A thermal imager including: a thermal sensor and a first temperature reference means including retro-reflective means for providing a retro-reflected image of the sensor for use as a first temperature reference, a second temperature reference means, said second temperature reference means including means for providing a second temperature reference at a different temperature from that of the retro-reflected image, an optical system for admitting electromagnetic radiation to the thermal sensor, the optical system including a field stop adapted to limit the field of view of the scene viewed by the sensor, and wherein said first and second temperature reference means are situated on portions of the field stop; scanning means adapted to scan over the field of view of the scene and, when required, also over each temperature reference means; and electrical means for processing an output of the thermal sensor.

2. A thermal imager as claimed in claim 1 wherein the second temperature reference means comprises a Peltier cell.

3. A thermal imager as claimed in claim 4 wherein the imager is a scanning type imager including one or more scanning elements adapted to scan over a field of view greater than that of the scene to be imaged and wherein the retro-reflective means is situated outside the field of view of the scene but within the possible field of view which may be scanned by scanning elements of the imager.

4. A thermal imager comprising:
a thermal sensor;
an optical system for admitting electro-magnetic radiation to the thermal sensor,
a field stop positioned to limit a field of view of a scene viewed by said thermal sensor,
a first temperature reference region including retro-reflective means for providing a retro-reflected image of the sensor as a first temperature reference,
a second temperature reference region including means for providing a second temperature reference at a known temperature different from the temperature of the retro-reflected image;
scanning means arranged to scan over the field of view of the scene and, when required, also over both temperature reference regions so as to provide two different temperature references; and
electrical means for processing an output of the thermal sensor.

5. A thermal imager as claimed in claim 4 wherein the thermal sensor comprises an array of thermal detector elements.

6. A thermal imager as claimed in claim 5 adapted to be scanned in swathes and wherein at least one of the swathes may be extended to scan each reference region.

7. A thermal imager as claimed in claim 6 wherein the first and second temperature reference regions are situated at the beginning and end of one swathe line only.

8. A thermal imager as claimed in claim 4 wherein the retro-reflective means comprises at least one corner cube.

9. A thermal imager as claimed in claim 4 including filtering means on the retro-reflective means for raising the perceived temperature of the retro-reflected image by a predetermined amount.

10. A thermal imager as claimed in claim 9 wherein the filtering means is a multi-layer coating.

11. A thermal imager as recited in claim 4 wherein said first and second temperature reference regions are situated on respective portions of the field stop.

12. A thermal imager as recited in claim 11 wherein said second temperature reference region comprises an untreated clamp region at ambient temperature.

13. A thermal imager as recited in claim 4 wherein said second temperature reference region comprises an untreated clamp region at ambient temperature.

14. A thermal imager as recited in claim 4 wherein said imager is scanned in swathes, and wherein at least one of said means providing said first and second temperature references has a width substantially equal to one of said swaths.

* * * * *